S. CHAPMAN.
Peat Machine.
No. 68,044.
2 Sheets—Sheet 1.
Patented Aug. 27, 1867.
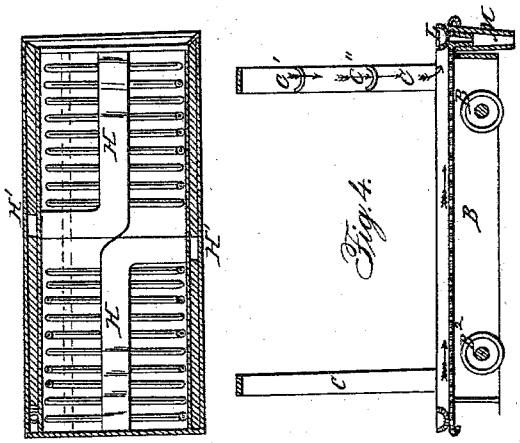
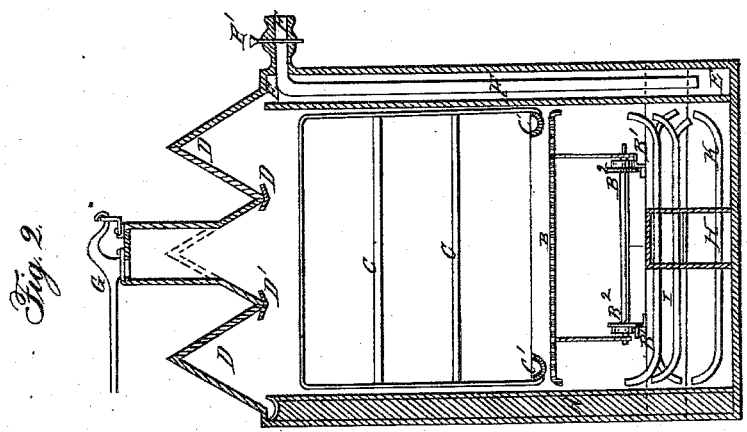
Witnesses:
Inventor:

S. CHAPMAN.
Peat Machine.
No. 68,044.
2 Sheets—Sheet 2.
Patented Aug. 27, 1867.
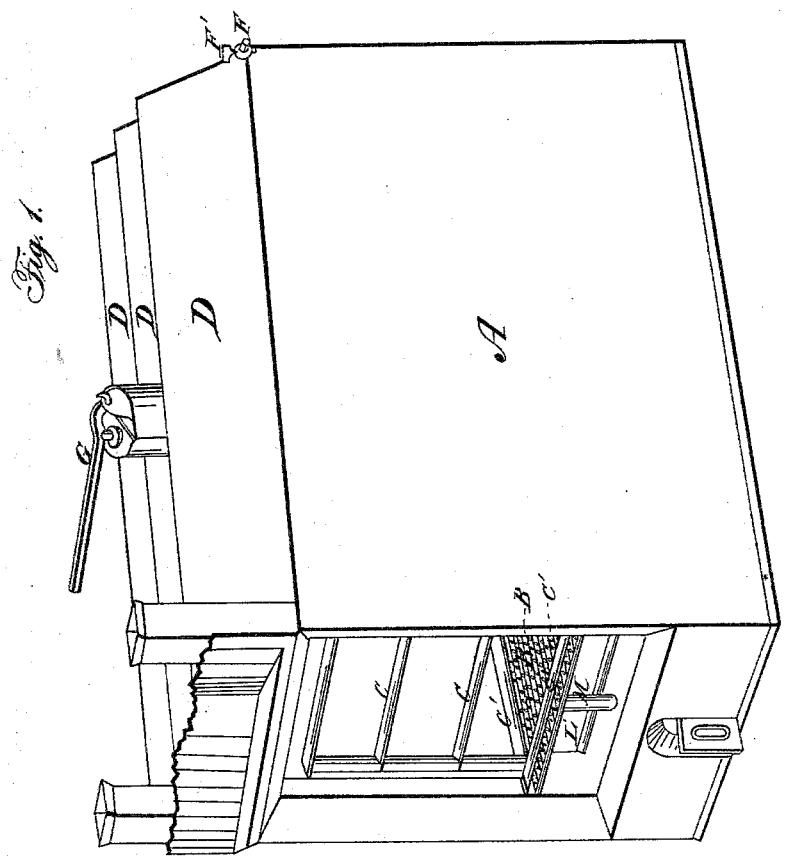
Witnesses:
Inventor:
Sam'l Chapman
By Dro Holloway & Co
Attys

United States Patent Office.

SAMUEL CHAPMAN, OF NEWARK, NEW JERSEY.

Letters Patent No. 68,044, dated August 27, 1867.

---

IMPROVEMENT IN KILNS FOR DRYING AND PREPARING PEAT.

---

The Schedule referred to in these Letters Patent and making part of the same.

---

TO ALL WHOM IT MAY CONCERN:

Be it known that I, SAMUEL CHAPMAN, of Newark, in the county of Essex, and State of New Jersey, have invented a new and useful Improvement in Kilns for Drying Peat and other substances under pressure; and I do hereby declare that the following is a full, clear, and exact description of the same, reference being had to the annexed drawings, making part of this specification, in which—

Figure 1 is a perspective view.

Figure 2 is a vertical transverse section.

Figure 3 a horizontal section and plan of the heating pipes and furnace, and

Figure 4 a vertical transverse section of the drying-frame and drip.

The same letters are employed in all the figures in the indication of parts which are identical.

My invention consists in, first, the mode of drying peat and other substances, so that by the continuous application of heat in an air-tight chamber the water may be expelled from the substances, the steam thus generated used for compressing by its pressure the substances as they are diminished in bulk by the evaporation of the water, and finally the oleaginous, resinous, or other analogous fluids be extracted; second, in so arranging an air-tight dry-house that it may contain a heating apparatus, suitable platforms or frames for supporting the articles to be operated upon, a metallic roof, so arranged as to act as a condenser for condensing the steam evolved, and means for withdrawing the water thus formed without permitting the escape of the heated air; third, in the arrangement and combination of parts specifically set forth in the claims hereinafter to be stated.

A represents the walls of the kiln, which I prefer to make double, with air-spaces, and so constructed as to be air-tight, the door or doors being so attached that by means of packed joints the chamber may be air and steam-tight, the door and other parts being strong enough to resist the pressure of the steam generated, as will be described hereinafter. The peat, or other material to be dried, is placed upon a car, B, composed of a foraminated plate resting upon trucks, $B^2$, running upon tracks, $B^1$, or it may be placed upon platforms resting upon the frame C supported upon the car, the frame being provided with troughs, $C'$, by which the oleaginous and other materials forced from the peat, and other materials under treatment, may be collected. D is a metallic roof, acting also as a condenser, by which the vapor filling the chamber will be condensed, flowing along the troughs $D'$ connected with one another, in such manner that the water condensed shall be collected in the well E between the walls of the drying-chamber. In order to draw off this water, and at the same time to keep the chamber perfectly air-tight, the pipe F is introduced, leading from the bottom to the top of the well, where it passes through the walls and discharges outside, the flow being regulated by the stop-cock $F'$. The depth of the well must be such that the weight of the column of water in the pipe F will counterbalance the pressure of the steam on the surface of water in the well, so that the water as condensed will flow off through that pipe, but the escape of the heated air from the chamber be prevented. G is a safety-valve, weighted to sustain the pressure of steam it is intended to maintain in the chamber, and no more. The heat is applied by means of the stove or furnace H, the walls of which will not permit the entrance of air into the chamber, the draught passing through the stove or furnace escaping at $H'$. I prefer to conduct the flues through the walls A, so as to utilize as much as possible the heat. A circulation of air and an equal distribution of heat through the chamber are maintained by means of a system of pipes, I, which open alternately on each side of the stove or furnace; near the floor, and passing through the upper part of the stove or furnace are curved upwards, discharging the current of air flowing through them into the chamber. Another set of pipes, K, in like manner passing through the stove or furnace, form the grate-bars, on which the fuel is placed. By this means I obtain a heat sufficiently great to convert the water, contained in the peat or other article to be dried, into steam of pressure sufficiently great to compress the peat as it is dried into a compact mass.

When it is desired to continue the drying process sufficiently to drive the oleaginous and analogous substances from the material to be dried, the frame C is used to sustain them, and the heat being continued after the water has been evaporated and passed out of the chamber, these substances being released by the action of the heat will flow along the troughs $C''$ and be collected, so as to flow through the pipe L into the well M, from which they will be drawn by the same means as already described for the water-well E and pipe F. When all the steam has been condensed and expelled from the chamber, the stop-cock $F'$ should be closed, to prevent the escape of the heated air.

What I claim as my invention, and desire to secure by Letters Patent, is—

1. The mode of desiccating, compressing, and extracting the oleaginous, bituminous, resinous, or other similar constituents from peat and other substances, by the continued application of heat only in a tight chamber, substantially as set forth.

2. The combination, within an air-tight chamber, of a heating apparatus, suitable supports for the material to be desiccated, and a condenser for collecting and carrying off the water evaporated, substantially as and for the purpose set forth.

3. The combination of the roof D, troughs D', well E, and pipe F, substantially as and for the purpose set forth.

4. The combination of the stove or furnace H and pipes I, arranged in relation to the air-tight chamber and one another, substantially as set forth.

5. The combination of the stove or furnace H and pipes K, arranged in relation to the air-tight chamber and one another, substantially as set forth.

6. The combination and arrangement of the drying-frame C, troughs C', and well M, substantially as and for the purpose set forth.

7. The process for drying and compressing peat, by the continued application of heat alone, in an air-tight chamber, substantially as set forth.

In testimony whereof I have signed my name to this specification in the presence of two subscribing witnesses.

SAMUEL CHAPMAN.

Witnesses:
R. MASON,
D. P. HOLLOWAY.